(12) United States Patent
Ajayan et al.

(10) Patent No.: US 9,453,120 B2
(45) Date of Patent: Sep. 27, 2016

(54) ALIGNED CARBON NANOTUBE-POLYMER MATERIALS, SYSTEMS AND METHODS

(75) Inventors: Pulickel M. Ajayan, Houston, TX (US); Ali Dhinojwala, Akron, OH (US)

(73) Assignees: The University of Akron, Akron, OH (US); Rensselaer Polytechnic Institute, Troy, NY (US)

( * ) Notice: Subject to any disclaimer, the term of this patent is extended or adjusted under 35 U.S.C. 154(b) by 391 days.

(21) Appl. No.: 13/088,775

(22) Filed: Apr. 18, 2011

(65) Prior Publication Data

US 2011/0241536 A1    Oct. 6, 2011

Related U.S. Application Data

(62) Division of application No. 11/428,185, filed on Jun. 30, 2006, now Pat. No. 7,927,666.

(51) Int. Cl.
*B05D 5/12* (2006.01)
*C08K 7/24* (2006.01)

(52) U.S. Cl.
CPC ............ *C08K 7/24* (2013.01); *C08K 2201/011* (2013.01); *Y10T 428/24174* (2015.01)

(58) Field of Classification Search
USPC ....... 427/77; 156/61, 247; 428/99, 221, 332, 428/357, 364; 977/742, 783, 842, 902
See application file for complete search history.

(56) References Cited

U.S. PATENT DOCUMENTS

| | | | |
|---|---|---|---|
| 7,611,628 B1* | 11/2009 | Hinds, III | 210/500.27 |
| 2005/0224220 A1* | 10/2005 | Li et al. | 165/185 |
| 2006/0068195 A1* | 3/2006 | Majumdar et al. | 428/323 |
| 2006/0073332 A1* | 4/2006 | Huang et al. | 428/367 |
| 2008/0292840 A1 | 11/2008 | Majumdar et al. | |

FOREIGN PATENT DOCUMENTS

WO    WO 2004/053464    *    6/2004

OTHER PUBLICATIONS

Yurdumakan et al., Synthetic gecko foot-hairs from multiwalled carbon nanotubes, Chemical Communication, The Royal Society of Chemistry 2005, p. 3799-3801.*

* cited by examiner

*Primary Examiner* — Austin Murata
(74) *Attorney, Agent, or Firm* — Renner Kenner Grieve Bobak Taylor & Weber

(57) ABSTRACT

The invention is directed to carbon nanostructure composite systems which may be useful for various applications, including as dry adhesives, electronics and display technologies, or in a wide variety of other areas where organized nano structures may be formed and integrated into a flexible substrate. The present invention provides systems and methods wherein organized nanotube structures or other nanostructures are embedded within polymers or other flexible materials to provide a flexible skin-like material, with the properties and characteristics of the nanotubes or other nanostructures exploited for use in various applications. In one aspect, the invention is directed to a carbon nanotube/polymer composite material having a plurality of carbon nanotubes formed into a predetermined architecture, with each of the plurality of nanotubes having a desired width and length. The architecture of the plurality of nanotubes defines at least one orientation for a plurality of nanotubes, and also defines the approximate spacing between nanotubes and/or groups of nanotubes. The carbon nanotube architecture is at least partially embedded with a polymer matrix in a manner that the architecture is stabilized in the predetermined architecture. The polymer matrix may also be formed to have a desired predetermined thickness.

17 Claims, 8 Drawing Sheets

FIG. 1
FIG. 4
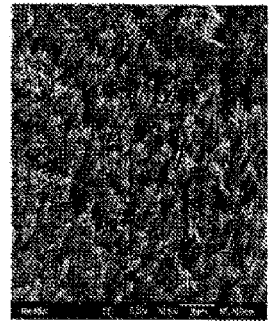
FIG. 5A
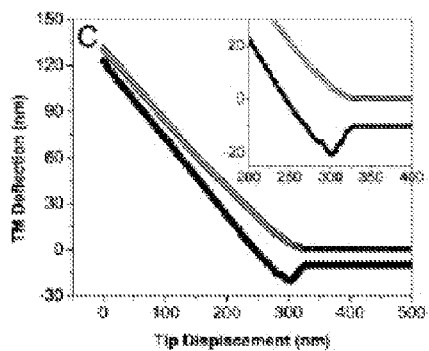
FIG. 5B
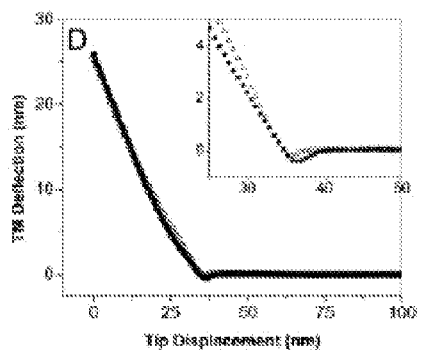
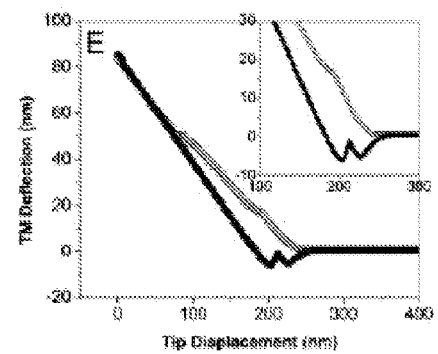
FIG. 5C

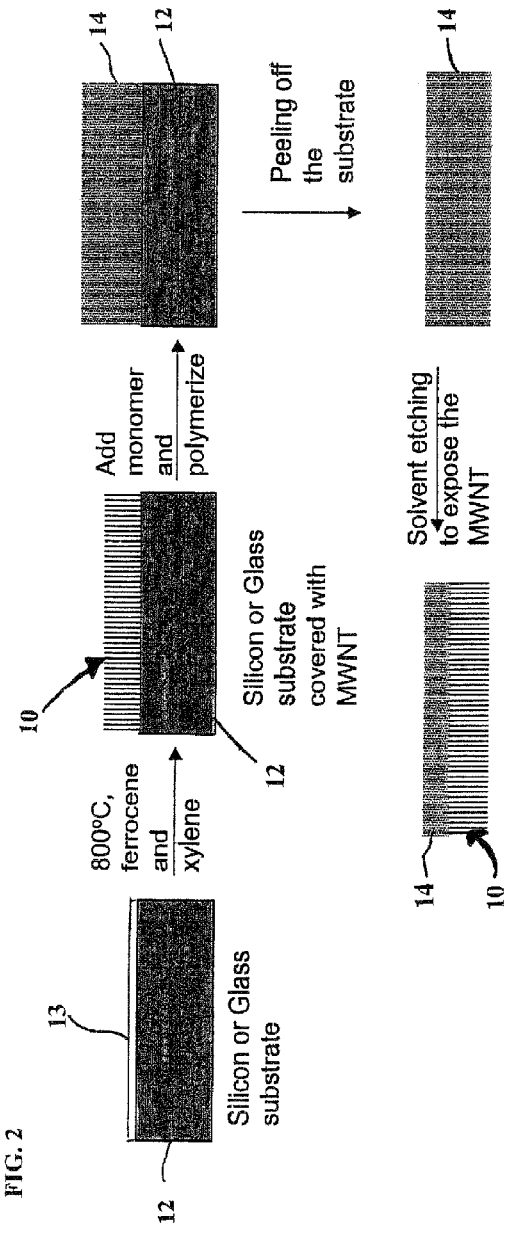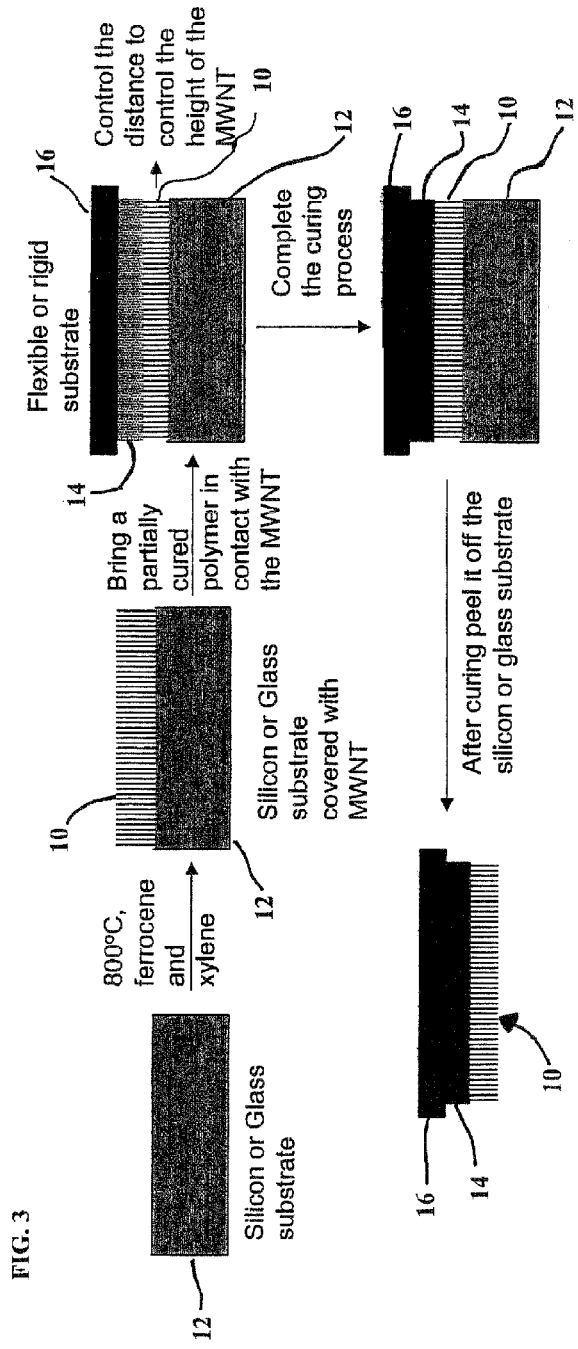
FIG. 2
FIG. 3

ALIGNED CARBON NANOTUBE-POLYMER MATERIALS, SYSTEMS AND METHODS

CROSS REFERENCE TO RELATED APPLICATIONS

This invention claims priority to and is a divisional application of U.S. patent application Ser. No. 11/428,185 filed Jun. 30, 2006, now U.S. Pat. No. 7,927,666, the contents of which are fully incorporated by reference.

FIELD OF INVENTION

The present invention relates to composite carbon nanostructures, such as nanotubes, integrated with a polymer matrix for providing diverse systems for different applications, such as dry adhesives, electronic systems, display devices and other applications. The invention is also directed to methods for forming such composite materials and for their use.

BACKGROUND OF THE INVENTION

The use and development of carbon nanotubes has expanded, as these materials have shown to be valuable in next generation industries including the fields of electronics and chemistry. The further development of carbon nanotube technology allows organized structures or intertwined randomly oriented bundles of carbon nanotubes to be formed. Techniques have been developed to controllably build organized architectures of nanotubes having predetermined orientations, such as vertically aligned nanotubes. Although such structures may be useful for a variety of purposes, the structures by themselves may be limited in terms of function and application.

In the area of adhesives for example, it would be desirable to provide dry adhesives which may be useful in a variety of applications and environments for which standard adhesives have deficiencies. Adhesives are typically wet and polymer-based, and have low thermal and electrical conductivity. For electronics, micro-electro-mechanical systems (MEMS), low or zero atmosphere environments, cryogenic or high temperature environments, or a variety of other areas, it would be desirable to provide a dry adhesive which is selectively attachable and detachable to/from a surface. It would also be desirable to provide an adhesive which has other beneficial properties, such as high electrical and thermal conductivity or high adhesion strengths while being selectively detachable. For example, the mechanism which allows a gecko lizard to climb a vertical surface or any other surface is based upon the anatomy of the gecko's feet and toes, wherein each five-toed foot is covered with microscopic elastic hairs called setae. The ends of these hairs split into spatulas which come into contact with the surface and induce enough intermolecular (van der WAALS,[VdW]) forces to secure the toes to the surface. The gecko's foot anatomy allows them to selectively adhere to any surface which they touch. Although attempts have been made to provide synthetic systems which mimic the gecko's feet and toe anatomy, no such systems have generally been successful. It would be desirable to provide an adhesive which mimics these characteristics, and provides a surface which interacts with other surfaces via intermolecular or VdW forces, via nanostructure technologies.

In a variety of other areas, the use of organized carbon nanostructures in unique configurations may provide valuable functions in biocompatible or bioactive systems, electronic displays, functional films or skins, or other applications.

SUMMARY OF THE INVENTION

The present invention is therefore directed to carbon nanostructure composite systems which may be useful for various applications, including as dry adhesives, electronics and display technologies biosystems, or in a wide variety of other areas where organized nanostructures may be formed and integrated into a flexible substrate. The present invention provides systems and methods wherein organized nanotube structures or other nanostructures are embedded within polymers or other flexible materials to provide a flexible skin-like material, with the properties and characteristics of the nanotubes or other nanostructures exploited for use in various applications.

In one aspect, the invention is directed to a carbon nanotube/polymer composite material having a plurality of carbon nanotubes formed into a predetermined architecture, with each of the plurality of nanotubes having a substantially predetermined width and length. The architecture of the plurality of nanotubes defines at least one orientation for a plurality of nanotubes, and also defines the approximate spacing between nanotubes and/or groups of nanotubes. The carbon nanotube architecture is at least partially embedded with a polymer matrix in a manner that the architecture is stabilized in the predetermined architecture. The polymer matrix may also be formed to have a substantially predetermined thickness.

Another aspect of the invention is directed to a method of forming a carbon nanostructure/polymer composite material by the steps of providing a substrate having a predetermined configuration, and providing a plurality of carbon nanotubes or other nanostructures formed into a predetermined architecture supported on the substrate. At least one polymeric polymer precursor is introduced onto the substrate in a manner to embed the predetermined nanotube architecture at least partially therein. Thereafter, the at least one precursor is polymerized so as to fix the carbon nanotubes in position and stabilize the predetermined architecture. The step of providing the plurality of carbon nanotubes may further design the nanotubes to have a substantially predetermined width and length, as well as defining at least one orientation for a plurality of nanotubes. The spacing between nanotubes and/or groups of nanotubes may also be controlled. The carbon nanotube architecture is at least partially embedded with a polymer matrix in a manner that the architecture is stabilized, and the polymerized matrix may be formed to have a substantially predetermined thickness.

The invention is also directed to methods and systems wherein multi-walled carbon nanotubes (MWNT) are constructed on polymer surfaces or partially within polymer films with strong nanometer level adhesion similar to or stronger than gecko foot-hairs.

The invention also relates to the use of carbon nanostructures integrated into a polymer matrix for providing bioactive or biocompatible systems for use with biological organisms or systems.

The invention is also directed to the use of organized nanostructures such as MWNT structures, in combination with flexible materials to form field emission displays on flexible substrates. Other flexible surfaces or coatings may be provided for use in a variety of other applications, such as a skin or coating on the surface of a vehicle or aircraft, wherein the characteristics of the carbon nanotubes can provide for properties of anti-friction, anti-static and non-wetting for example.

Other aspects and advantages of the invention will become apparent upon a reading of the description of the present invention in conjunction with the drawings.

BRIEF DESCRIPTION OF THE DRAWINGS

FIG. 1 is a scanning electron microscope image of vertically aligned multi-walled carbon nanotube structures.

FIG. 2 is a schematic illustration of a method for preparing a carbon nanotube-polymer composite according to the invention.

FIG. 3 is a schematic illustration of an alternative method for preparing a carbon nanotube-polymer composite according to the invention.

FIG. 4 is a scanning electron microscope image of the carbon nanotube structures shown in FIG. 1 embedded in a polymer matrix and having a portion thereof exposed from the surface.

FIGS. 5A-5C show graphical representations of adhesion characteristics of a carbon nanotube/polymer composite material formed in accordance with an embodiment of the present invention, showing deflection-versus-displacement curves during loading-unloading cycles of a silicon probe engaging exposed carbon nanotubes associated with the composite as formed according to FIG. 2 or 3 as examples.

DETAILED DESCRIPTION OF THE INVENTION

Figure 6:
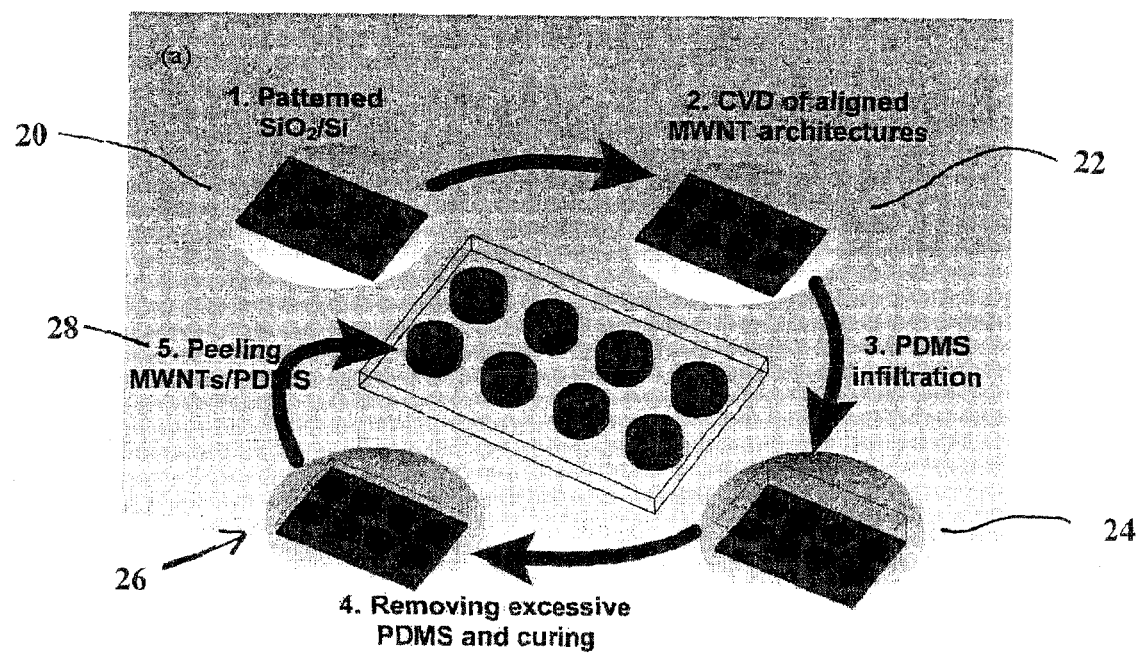
FIG. 6 is a schematic illustration of a further method of forming carbon nanotube-polymer composites according to the invention.

Turning now to the FIGS., a first embodiment of a carbon nanostructure/polymer composite material according to the invention will be described with reference to FIGS. 1-4, wherein a large number of carbon nanotubes, such as multi-walled carbon nanotubes (MWNT) 10 are formed on a substrate 12 as shown in FIG. 1. The growth of vertically aligned MWNT 10 on a substrate 12, such as silicon substrate, may be performed in any suitable manner, with various approaches having been developed. Alternatively, the nanostructures may be single-walled nanotubes, or nanosheets or other nanostructures formed of carbon.

One method is to selectively grow carbon nanotubes on silica templates located on a silicon substrate at set forth in Z. J. Zhang, B. Q. Wei, G. Ramanath, P. M. Ajayan, Appl. Phys. Lett. 77, 3764 (2000), which is hereby incorporated herein by reference. The use of this template structure is advantageous in that it does not require the deposition and patterning of a catalyst material on the substrate 12, although such an approach may also be used according to the invention. Another method may be as described in published U.S. Patent Application 2003/0165418, which is incorporated by reference herein. Any other suitable methods to provide organized architectures of carbon nanotubes on a substrate are also contemplated and within the scope of the invention. The substrate 12 may be formed of other materials such as quartz, molybdenum, or other suitable materials. Further, the carbon nanostructures may be formed by other suitable techniques, such a by plasma enhanced chemical vapor deposition, or any other suitable technique. Such processes may form other carbon nanostructures, such as nanofibers, sheets, pillars or other forms. The carbon nanotubes or other carbon nanostructures also have good mechanical properties such as very high Young's modulus and very high tensile and bending strengths, making them useful for the applications as described herein.

Turning now to FIG. 2, a first method for producing a carbon nanotube-polymer composite according to the invention is shown. In this example, the growth of nanotubes on a silicon substrate may be accomplished through chemical vapor deposition (CVD). A gaseous mixture of ferrocene (0.3 g), is used as a catalyst source, and xylene (30 mL), is used as a carbon source. Other suitable materials may be used if desired. The gaseous mixture is heated to over 150° C. and passed over the substrate 12 for ten minutes, with the substrate 12 itself being heated to approximately 800° C. in a quartz tube furnace. The substrate 12 may be provided with an oxide layer 13 on which MWNT 10 grow with controlled thickness and length. If desired, the oxide layer of the substrate 12 can be patterned by photolithography or other suitable techniques, and may be followed by a combination of wet and/or dry etching in order to create various predetermined patterns of the oxide layer 13 and correspondingly of the carbon nanotubes 10 grown thereon. After the oxide layer 13 of the substrate 12 is covered with MWNT to form a desired and predetermined architecture of carbon nanostructures, the sample, with the MWNT side facing up, has at least one polymeric polymer precursor material, such as at least one monomer, poured thereon to encase the carbon nanostructure architecture. Thereafter, the precursor materials are polymerized to embed the carbon nanostructures in a polymer matrix. For example, a methyl methacrylate monomer (60 mL) may be used, and then polymerized using a 2,2'-azobis(isobutyronitrile) initiator (0.17 g) and a 1-decanethiol chain transfer agent (30 µL) in a clean room. As seen in FIG. 2, the MWNT are then encapsulated within a polymer matrix 14 on substrate 12. The MWNT or other nanostructures and architectures are completely embedded and stabilized in the PMMA matrix 14, without disruption of the organized architecture of the carbon nanostructures as originally grown or provided on substrate 12. To facilitate maintaining the desired architecture of the carbon nanotubes or other nanostructures, the introduction of the monomer or other precursors is performed in a manner to flow around the nanotube architecture without forcing the nanotubes together or otherwise significantly disrupting their position and orientation on the substrate 12. Similarly, polymerization is completed without disruption of the nanotube architecture, with properties controlled to maintain the desired configuration. For example, polymerization may be performed in a manner to reduce possible effects of evaporation upon the matrix 14 and ultimately the carbon nanotubes embedded therein. After completion of polymerization in a water bath at 55° C. for 24 hours, the matrix 14 may simply be peeled from the substrate 12 forming a flexible skin-like sheet in which the carbon nanotubes 12 are fully embedded and stabilized.

Polymeric matrix materials according to the invention may be of any suitable type, wherein polymeric polymer precursors may include monomers, dimers, trimers or the like. Monomers utilized in this invention may generally be selected from the family of vinyl monomers suitable for free radical polymerization under emulsion conditions. Non-limiting examples of suitable vinyl monomers include methacrylates, styrenes, vinyl chlorides, butadienes, isoprenes, and acrylonitriles, polyacrylic and methacrylic esters and any other suitable precursor materials. The matrix polymer may be a polymer of one or more of the following monomers: methyl methacrylate (MMA), other lower alkyl methacrylates (e.g. ethyl methacrylate, propyl methacrylate, iso-propyl methacrylate, butyl methacrylate, 2-ethylhexyl methacrylate, etc., as an example. A starting monomer formulation may also include one or more polymerization initiators. These include, for example, benzoyl peroxide, lauryl peroxide, azobis(isobutyronitrile), 2,2'-azobis(2,4-dimethyl-4 methoxypropionitrile), and 2,2'-azobis(2-methylpropionitrile) or other suitable initiator materials. These are used in small amounts which are well known in the art. Any initiator that is suitable for free radical polymerization can be considered according to the invention. Further, the polymer matrix may also be modified using nanofillers as an example. Nanofillers are fillers having at least one dimension in the nanoscale (1-999 nm). Suitable fillers may include, without limitation, clay minerals, fibers, microspheres, and layered silicates. Such nanofillers may have their surfaces modified by surface functionalization with ionic groups or the like to provide desired interaction in the polymer matrix. Additional optional components may be present in the polymer matrix if desired, such as chain transfer agents, which are typical of free radical polymerizations, to facilitate the polymerization of the monomer or other polymerizable components. Other optional components that may facilitate use in various applications may include colorants, mold-release agents, and other known modifiers. The starting monomer formulation or mixture may also include a crosslinking agent, as for example ethylene glycol dimethacrylate or other difunctional (i.e., diolefinic) monomer or mixture thereof. The polymeric materials may also be thermoset plastics or other suitable epoxy type materials. Epoxy resins useful in the present invention can be monomeric or polymeric, saturated or unsaturated, aliphatic, cycloaliphatic, aromatic or heterocyclic, and they can be substituted if desired with other substituents besides the epoxy groups, e.g., hydroxyl groups, ether radicals, halogen atoms, and the like. Also, as will be described in relation to other embodiments, materials such as silicones may be used to integrate carbon nanostructures therein, such as poly(dimethylsiloxane) or PDMS. Many other suitable polymeric materials are contemplated as will be understood by those skilled in the art.

The flexible (or rigid) matrix 14 may then be used for a variety of applications, with one such application being to form a flexible skin-like material which could be used as a dry adhesive, simulating gecko foot-hairs. In this example, the matrix 14 may then be subjected to solvent etching to expose a portion of the MWNT 10, such as from the substrate-facing side of the matrix 14. For example, etching the top 25 microns with a solvent such as acetone or toluene and subsequently washing with deionized water, will expose a predetermined length of the MWNT 10. The length of the nanotubes 10 which are exposed may be controlled by varying the solvent etching time as an example. Other suitable techniques for selectively exposing a length of the carbon nanotube fibers embedded within matrix 14 are contemplated. Thus, as should be evident, the particular nature of the exposed carbon nanotubes may be selectively controlled both upon growing or producing the nanotubes themselves and forming the architecture on substrate 12 as desired, as well as in selectively controlling the length and spacing of the exposed carbon nanotubes for various wide-ranging applications.

An alternative method for forming the composite according to the invention is shown in FIG. 3. Again, a substrate 12 may have an architecture of MWNT 10 grown thereon via an oxide layer or in any other suitable manner. Thereafter, a flexible or rigid substrate 16 provided with a partially cured polymeric material 14 disposed thereon is brought into contact with the MWNT 10 provided on substrate 12. In this example, the MWNT 10 are at least partially embedded within the partially cured polymer 14, without disruption of the position or orientation of the carbon nanotubes on substrate 12. The MWNT are only partially embedded within the polymer matrix 14, but are fully stabilized in their original and desired position as on substrate 12. Thereafter, the curing of the polymer 14 is completed in a manner to maintain the position of the partially exposed carbon nanotubes, and subsequent to curing, the assembly of the flexible or rigid substrate 16, and the polymer matrix including the partially embedded MWNT may be peeled from substrate 12. As shown in FIG. 3, a composite including the flexible or rigid substrate 16 and the polymer matrix 14 with partially exposed MWNT 10 is produced, which again may be used for a variety of applications. Similar to the embodiment of FIG. 2, the nanotube configurations and architectures, as well as the length of the exposed nanotubes may be precisely controlled for adapting to a variety of applications.

Using such techniques, FIG. 4 shows an example of MWNT transferred into a PMMA matrix as produced by the example of FIG. 2, wherein the MWNT grown on substrate 12 were approximately 65 microns long, with approximately 25 microns exposed after solvent etching to form the flexible skin-like material having a surface comprised of exposed MWNT.

Again, one such application for the flexible skin-like material having a selectively controlled surface formed of exposed lengths of carbon nanotubes may be for a dry adhesive as an example. The composites formed as previously described have been shown to have significant adhesive behavior simulating or exceeding the characteristics of the gecko foot-hairs for example. As an example, adhesive behavior of samples of MWNT brushes as formed according to the invention were measured with a Digital Instruments Nanoscope IIIa multimode scanning probe microscope (SPM). Force-distance curves were obtained between the brushes and a silicon probe under ambient conditions, where a hysteresis loop (pull-off) corresponds to adhesion forces and elastic properties. As shown in FIG. 5A, a typical loading-unloading curve for such a system is shown. The curve shows weak repulsive forces upon approach and high adhesion upon retraction. The loading regime of the curve exhibits a change in slope reflecting an approximation for the maximum penetration depth of the probe. Based upon the configuration of the carbon nanotubes, the penetration depth may be different with lower penetration depths being observed when the nanotube bundles are aligned vertically from the polymer surface and are densely packed. Depending on the configuration of the composite, higher depth and adhesion forces may be provided where the bundles of nanotubes create surface roughness which provides penetration space for the probe or other surface. In testing, areas of surface roughness exhibited adhesion forces with a larger distribution in pull-off forces due to differences in penetration depth and the number of multiple contacts made with the probe. As shown, FIG. 5B shows a broad pull-off force curve, whereas multiple pull-offs are shown in the curve of FIG. 5C. It is thus apparent that adhesion force of the composite nanotube-polymer system may be controlled based upon the characteristics of the exposed carbon nanotubes. For example, for use as a dry adhesive, the exposed lengths of nanostructures such as nanotubes may be preferably less than 50 μm, and more preferably between 10-30 μm. Further, the packing density of the carbon nanostructures may be controlled to provide desired adhesive characteristics, such as in a range of $10^5/cm^2$ to $10^{12}/cm^2$ depending on desired characteristics for example.

The adhesion forces of the nanotube bundles can be compared with that of gecko foot-hair. The typical adhesive force in a setae corresponds to $10^{-4}$ nN $nm^{-2}$, as estimated from a single setae attached to the cantilever of a microelectromechanical system. Since the adhesive forces depend on the preloading of the setae, this number is also likely to be an underestimate. Conservatively, it may be assumed that the contact area is equivalent to that of a cone with the height equal to the maximum penetration depth determined from FIG. 5. The calculated minimum force/area is $1.6\pm0.5\times10^{-2}$ nN $nm^{-2}$, which is much greater than the estimate value of a gecko's setae. These adhesion forces may be a combination of VdW forces and energy dissipation during the elongation of the contacted carbon nanotubes which comes from their material properties. The VdW forces originate from contact with multiple nanotubes and/or from large contact areas with a single nanotube, while the energy dissipation is due to their high strength and flexibility under strain. It has also been found that the adhesion forces do not appear to be influenced by the chemical composition of the solid substrate in which the carbon nanotubes are partially embedded. The adhesive characteristics of the composite may thus provide uses as dry adhesives for microelectronics and low vacuum, cryogenic or high temperature applications, where typical adhesives cannot be used, or in a variety of other environments or applications. It should also be recognized that devices made according to the invention may allow separately formed composite materials according to the present invention to interact and adhere with one another. Alternatively, the nanostructures may be exposed on both surfaces of the composite so as to allow each surface to act as an adhesive surface. Further, in this and other embodiments, the composite material may also yield significant benefits in providing high thermal conductivity and/or insulation characteristics, which may be particularly important in electronics or other applications.

The ability to form a desired and predetermined architecture of carbon nanotubes, which are subsequently partially embedded and stabilized within a polymer matrix according to the invention may also provide for flexible skin-like materials which may be used as coverings or coatings in a variety of environments and applications. For example, electrodes may be formed having these composite materials incorporated therein for significantly increasing the surface area or providing other significant benefits. Additionally, it is possible to align the carbon nanofibers and selectively expose a portion to form coatings which may have significant properties such as anti-friction, anti-static, or non-wetting surfaces. For various embodiments, it may be useful to form the nanostructure architecture such that individual carbon nanostructures are tangled around adjacent carbon nanostructures (especially at their exposed ends). Such tangling may provide surface unevenness which may increase the surface area of contact with a surface or provide other benefits for certain applications. Alternatively, such unevenness may be provided by forming the nanostructures to have different heights among the various individual carbon nanostructures.

Although the above examples describe the use of multi-walled carbon nanotubes, other carbon nanotube structures may be used in accordance with the invention. Similarly, although the polymer used in the example is a glassy PMMA, other elastomeric polymers with different moduli and flexibility may be used for other applications as contemplated in the invention. The ability to use various polymers provides flexibility to tailor the flexible substrate produced for any desired application. Chemical properties may also be controlled as desired for various applications. As shown in one or more of the FIGURES, in some embodiments of the present invention, the carbon nanostructures are substantially vertically aligned and extended uniformly in one direction only.

Figure 7:
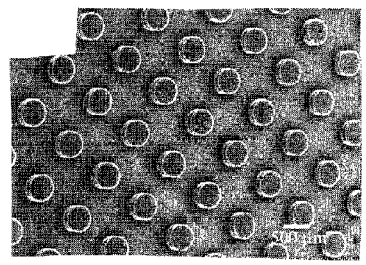
FIG. 7 shows a scanning electron microscope image of the carbon nanotube architectures before being embedded into a polymer matrix.
Figure 8:
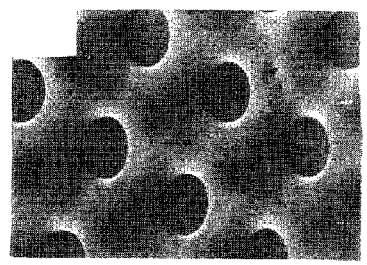
FIG. 8 is a scanning electron microscope image showing the nanotube architectures of FIG. 7 after polymer infiltration.
Figure 9:
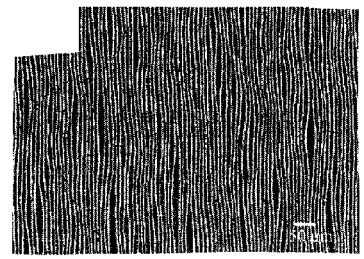
FIG. 9 is a top view of nanotube walls prior to polymer infiltration.
Figure 10:
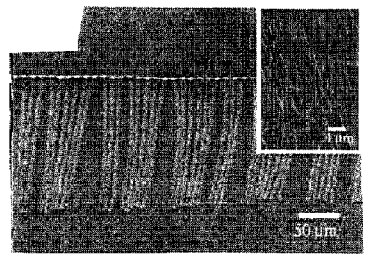
FIG. 10 shows a cross-sectional scanning electron microscope image of the nanotube walls shown in FIG. 9 after polymer infiltration.

Turning now to FIG. 6, a further embodiment of fabricating a carbon nanotube array structure in conjunction with a polymeric substrate is shown. As a first step, similar to that previously described, a prepatterned silicon substrate 20 has bundles of MWNT grown thereon using thermal CVD of Ferrocene and Xylene at 800° C., to form an array of vertically aligned patterned MWNT on the substrate at 22. In this example, a polymer, such as PDMS may be utilized for embedding the MWNT architectures so as to stabilize and fix the MWNT in position. A PDMS prepolymer solution, which may be a viscous mixture of base/curing agent, such as in a weight ratio of 10:1, may be poured over the aligned nanotube structures on the substrate at 24. The arrays of nanotubes are embedded within the soft polymer matrix without disturbing the shape, size or alignment of the nanotubes. Although a particular architecture of aligned MWNT architectures is shown in this example, it should also be recognized that any desired architecture may be easily formed in a similar manner. In this example, subsequent to embedding the nanotube structures on the substrate within the soft prepolymer solution, any excessive polymer solution may be removed to obtain a desired thickness for the nanotube-PDMS composite film being produced. Again in this manner, the particular thickness of the composite film may be controlled for optimizing the arrangement for a particular application or environment (at 26). The PDMS is then thermally cured and, subsequently, self-standing nanotube-PDMS composite films may simply be peeled off from the silicon substrate at 28. This process has been used to make nanotube-PDMS composite films, wherein FIG. 7 shows a tilted SEM image of an array of cylindrical pillars of selectively grown and aligned MWNT structures on a substrate. In this example, the diameter of the MWNT structures may be in the range of 1-500 μm using photolithography. In FIG. 8, the surface morphology of these nanotube pillars is shown after PDMS infiltration, and subsequent completion of polymerization. It has been found in this process, that it is possible to transfer smaller and more densely distributed nanotube architectures into the PDMS matrix, such as structures only a few micrometers in scale. Further, these structures have been shown to effectively retain their original alignment, shape, and size inside the resulting composite matrix, after polymerization and subsequent to peeling off from the substrate. An alternative nanotube structure is shown in FIG. 9, wherein nanotube walls are grown on the substrate, wherein the walls may have desired width, height and spacing between walls. In FIG. 10, a cross-sectional SEM image of the nanotube walls shown in FIG. 9 show that these structures are retained subsequent to infiltration by the PDMS and polymerization thereof. To facilitate this, the selected polymeric materials may be chosen to provide conformal filling of the spaces between individual nanotubes and building blocks thereof in an effective manner. If desired, other chemical agents may be used or polymeric materials chosen to enhance wettability relative to the nanotube architectures to form a relatively defect-free composite film retaining the original nanotube architecture.

Figure 11A:
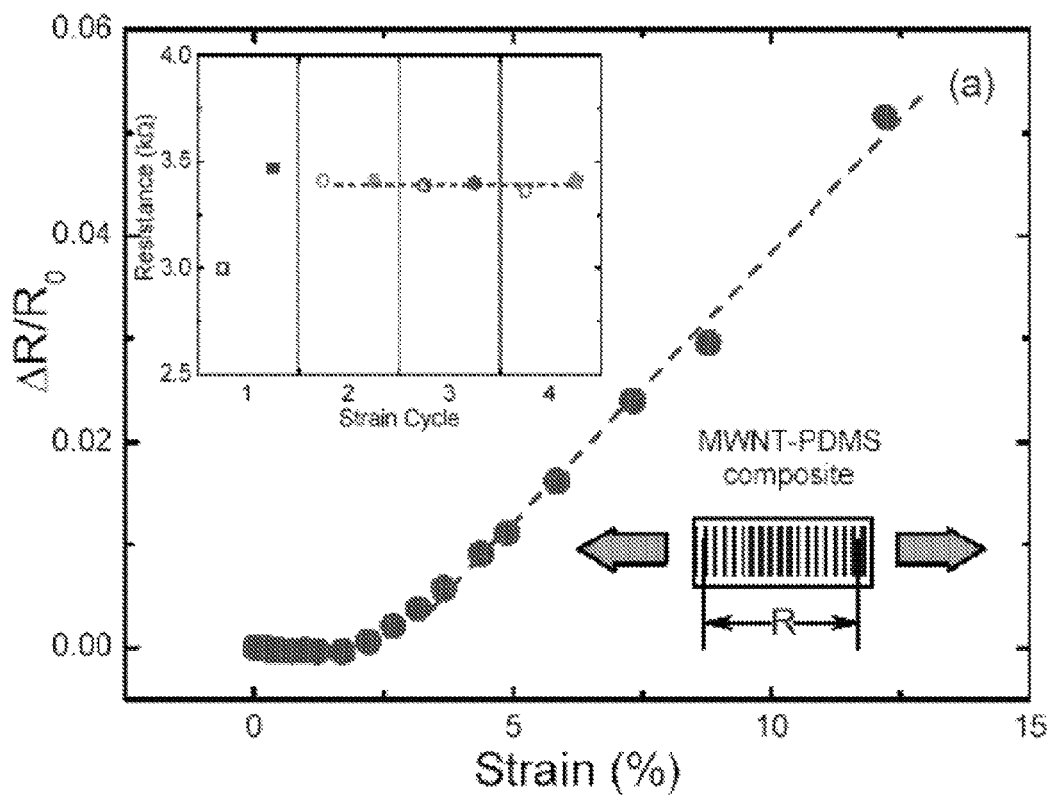
FIGS. 11A and 11B show graphs of electrical resistance of a nanotube-polymer composite structure such as formed according to FIG. 6, relative to strain and compression.
Figure 11B:
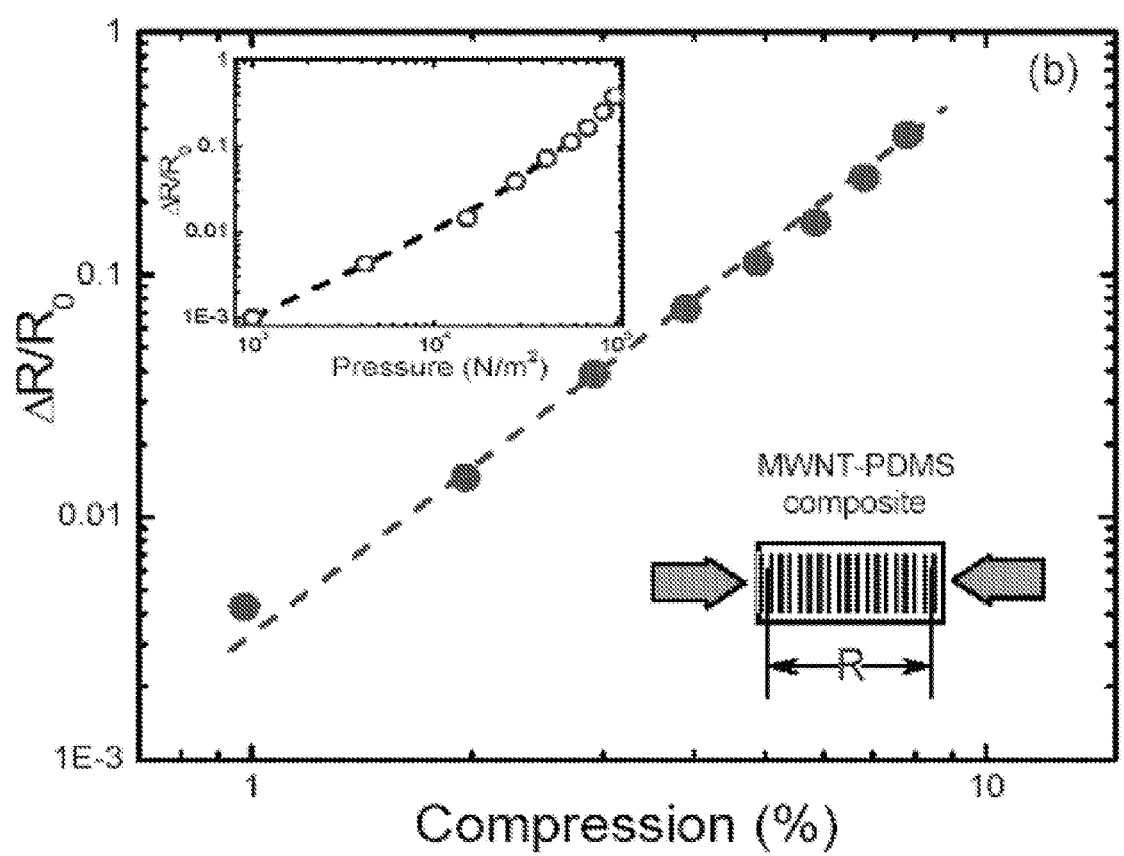
Figure 14:
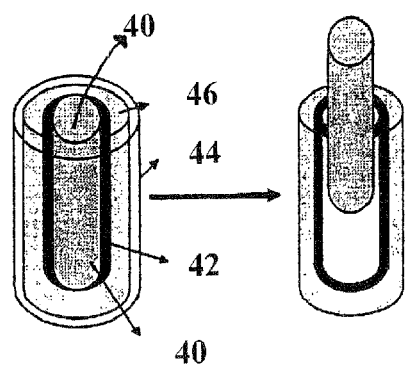
FIG. 14 shows a schematic illustration of a bioactive composite for use in a biological system formed according to an embodiment of the present invention.

The composite films formed according to the invention provide an extremely flexible and otherwise deformable matrix which may allow the film to be produced in any of a variety of desired configurations and geometries, while maintaining a nanostructure architecture therein. Further, it was found that the composite films according to the invention provide stable electromechanical structures, which enable useful electronic applications. The composites having nanotubes architectures embedded therein are conducting, and sustain the conducting character over large percentages of strain imposed upon the flexible composite. Measurements of resistance as a function of tensile and compressive strains, with deformation and resistance measurements conducted perpendicularly to the alignment of nanotubes in a composite sample are shown in FIGS. 11A and 11B. FIG. 11A shows the typical variation of the normalized composite resistance according to this embodiment, under an applied tensile strain. The inset graph of FIG. 11A shows a summary of the zero strain conditions before and after each strain cycle. As seen, the resistance scales generally linearly beyond a small strain value (approximately 2.5%). The inset graph shows the change in zero-strain resistance before a strain cycle as indicated by the open markers in the graph, and after a strain cycle as indicated by the solid markers in the graph. This summary generally shows that there was an irreversible increase in normalized resistance of approximately 10-15% after the first strain cycle, which thereafter stabilizes over multiple strain cycles.

FIG. 11B shows the normalized resistance as a function of compression, with the values shown as a "log-log" plot showing the normalized resistance during compressive strain cycles. The inset graph of FIG. 11B again shows the summary of the zero-strain resistance both before and after each strain cycle in the testing. As can be seen in FIG. 11B, the normalized resistance increases in general following a power-law dependence on strain. The inset graph shows the device can detect very small changes in pressure of the compressive strain, such as for example in the range of approximately 1000 N/m$^2$.

For these examples, a sample of composite material was provided having a length of 1-2 centimeters, a width of 1-2 millimeters, and a height of approximately 100 μm. Titanium wires were embedded into the composite matrix during curing of the polymer to obtain electrical contacts. The zero-strain lateral resistivity of the composite material varied between 1-10 Ω-cm for various samples, and increased monotonically for both tensile and compressive strains. The aligned nanotube architecture provides a lateral network of conducting fibers, which are connected to each other, and provide a conducting path through the material. Tensile and compressional forces may change the contact area between neighboring filaments to produce variances in accompanying electrical properties. For example, based upon the resistance characteristics from strains imposed upon the composite material, applications of these structures as strain and pressure/touch sensors is contemplated. Further, based upon the conducting nature of the carbon nanotubes under strain, flexible electronic requirements may be provided, such as a flexible cathode for an integrated field-emission device (FED). The high aspect ratio of the carbon nanotubes or other nanostructures and electrical conducting characteristics, would allow use in field emission technologies such as a field emission display devices.

Figure 12:
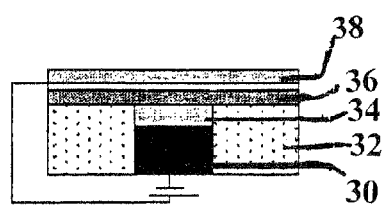
FIG. 12 shows a schematic illustration of a flexible Field Emission Display (FED) using carbon nanotube/polymer composites according to the invention.

As shown in FIG. 12, a flexible/plastic field-emission display may be provided using the composites according to the invention. Carbon nanotube structures may be patterned on a rigid glass substrate, with different colors obtained using phosphorous technology. The schemes of transferring the patterns into and onto a polymer surface can then be used to prepare CNT cathodes wherein a bundle of carbon nanotubes 30 is embedded within insulating polymer 32 according to the invention. An electron transporting layer 34 is provided on top of the CNT bundle, with a layer of phosphorous or LED polymers 36 disposed on the top of the composite material. A protective plastic layer 38 may be provided, with electrical contacts made to the cathode assembly. The flexible interconnect layer 34 may be integrally formed into the assembly if desired, and the polymer matrix itself may incorporate phosphorous-based materials or LED polymers to reduce the need for providing such materials otherwise. Patterns may be disposed on the polymer substrates using soft lithography or other suitable techniques. As it is possible to control the roughness, etching and length of the carbon nanotubes, depending upon the display application, the cathode may be optimized for efficient field-emission. In addition, the chemistry may be optimized to obtain high efficiency of light emission. It is contemplated that flexible displays according to the invention may be used for a variety of applications, including, high definition displays for television, portable newspapers and magazines, head gear for military or entertainment applications, cell or smart phones, PDA's and many other applications.

As an example, testing of field-emission properties was performed on samples of composite materials according to the invention. As shown in FIG. 6, a patterned MWNT-PDMS composite is formed in a cylindrical shape, such as having a diameter of approximately 500 μm. It has been found that adjusting the quantity of PDMS in fabricating the composite allow films to be produced with few or no exposed nanotubes on the top surface of the composite, while the bottom surface of the pattern, where the ends of the nanotubes were completely exposed, was coated with a Ti/Au material and fixed to a metal electrode using a conducting silver paint or the like, thereby forming a composite cathode. A metal anode with an adjustable separation distance was positioned parallel to the top surface of the MWNT-PDMS composite, and the gap therebetween was adjustable. As a possible preconditioning step, high currents may be run through the cathode/anode arrangement, to cause any long or entangled masses of nanotubes to be burnt off while retaining desired length and separation of nanotubes on the top surface of the film composite. Field-emission measurements were performed under a vacuum of approximately $5 \times 10^{-4}$ Torr. When the effective electric field around a nanotube tip exposed on the surface is large enough to overcome the work function of the nanotube (typically estimated at about 5 eV for carbon nanotubes), field emission will occur. The emitted current follows a known mechanism, called the Fowler-Nordheim mechanism, where the current density is approximately related to the effective field through the equation:

$$J_{FN} = (e^3 F^2 / 8\pi h\phi) \cdot \exp[-(8\pi\sqrt{(2m)}/3he)(\phi^{3/2}/F)],$$

wherein F is the effective electric field seen by the emitting region, and $\phi$ is the work function of the nanotube. If the separation distance is d, then the field-enhancement factor, $\beta$, is the ratio between the effective field and the applied field, set forth as:

$$\beta = F/(V/d),$$

where V is the applied voltage across the device electrodes. Further, if the effective surface area of the emission is denoted $\alpha$, then the measured current is given by:

$$I = \alpha J_{FN}.$$

This expression can be written as:

$$\ln(I/V^2) = \ln C_1 - C_2/V, \text{ where, } C_1 = (e^3/8\pi h d^2\phi)\beta^2\alpha \text{ and } C_2 = (8\pi d\phi^{3/2}\sqrt{(2m)}/3he)(1/\beta).$$

Figure 13:
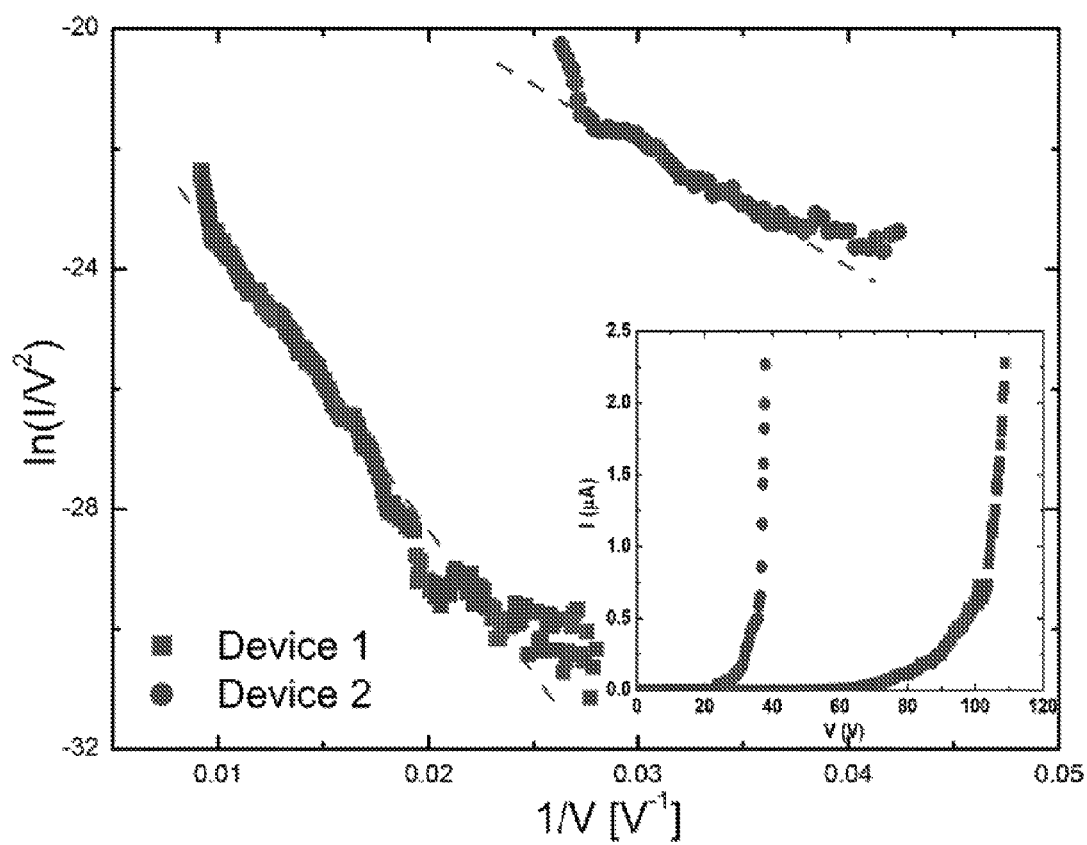
FIG. 13 shows a Fowler-Nordheim plot of field emission, with the inset graph showing emission current for applied voltages for several nanotube-polymer composites according to the invention.

As shown in FIG. 13, a Fowler-Nordheim (FN) plot shows the relationship of ln (I/V$^2$) versus 1/V. The characteristics of two samples devices are shown, with the inset graph showing the emission current for applied voltage for each sample. From the Fowler-Nordheim plot of FIG. 13, it can be seen that the emission characteristics of the system generally follows the FN equation over a broad range of applied voltages, with slight deviations at the lowest and highest bias values. Such deviations may be associated with instrument insensitivity or at the high value possibly from an enhanced field current due to various factors. From the slope of the FN plots as shown in FIG. 13, a field-enhancement factor, $\beta$, of approximately 8,000 was obtained for Device 1, with a better value of approximately 19,100 for Device 2. Other device properties obtained from the FN plots are set forth in the following Table 1.

TABLE 1

Device Properties Obtained From the Fowler - Nordheim Plots

| Device | Enhancement Factor, $\beta$ | $E_{to}$ (V/µm) | Comments on Current Density |
|---|---|---|---|
| 1 | 8000 | 0.87 | 1 mA/cm$^2$ @ 2.16 V/µm |
| 2 | 19100 | 0.5 | 1 mA/cm$^2$ @0.76 V/µm |

As seen therein, the turn-on fields, $E_{to}$, were calculated for the devices, with the values listed in Table 1 indicating high field emission. A nominal current density of 1 mA/cm$^2$ over the entire top surface of a nanotube, was achieved easily at threshold fields of 2.16 and 0.76 V/µm for the samples of devices made according to the invention. These values can be reduced by patterning smaller-diameter pillars. Further electrical isolation of the emitting nanotubes from neighboring nanotubes may be provided by use of a dielectric material or insulator therebetween to improve field emission characteristics. As an example, in the samples of field emitters according to the invention, the devices formed had very few tips exposed above the PDMS surface, and those nanotubes that were exposed, had an exposed length of approximately 2 to 3 µm, while being separated by distances of similar or larger lengths. This arrangement was found to decrease mutual screening of the electric fields produced by the nanotubes, and provides large field-enhancement factors with low turn-on fields. The stability provided by embedding the nanotubes within the PDMS matrix prevents movement of the nanotubes with respect to the cathode during high-field operations, providing a well functioning and durable device. For example sub-1 V/µm turn-on fields and threshold fields of a few volts per micrometer may be provided, while remaining stable, flexible and transferable. Such field effect transmission devices may be used for various portable electronic and electro-mechanical devices or other applications.

A field emission display according to the invention may then be formed using the flexible FED as shown in FIG. 12 as an example. As the composite systems are shown to have very efficient electron emission, this may be used to provide a large screen display based on FED technology. Carbon nanostructures on a flexible plastic substrate can provide significant advantages in manufacturing of flexible displays for various applications as previously noted.

In another application according to the invention, a bioactive or biocompatible coating may be formed using nanotubes disposed in a polymer matrix. Such a coating may be formed integrated with a polymer and formed to simulate macroscopic objects such as synthetic blood vessels, stints, membranes for dialysis, and other components, which may be exposed to blood or other biological materials. As shown in FIG. 13, a method of forming carbon nanotubes on the inside of a polymer/nanotube composite capillary is shown, wherein a glass rod or other suitable substrate 40 has carbon nanotubes 42 grown over its exterior surface. The rod with carbon nanotube fibers grown thereon may then be disposed in a larger diameter capillary 44. The annulus surrounding the glass rod 40 with carbon nanotubes 42 disposed thereon is then filled with a suitable monomer or other polymer precursor material 46, and polymerization is accomplished in any suitable manner, such as by the application of heat or the like. The polymer layer 46 is then disposed completely around the glass rod 40 and carbon nanotubes 42 formed thereon, thereby embedding the nanotubes in the polymer matrix. After polymerization, the glass rod 40 can be removed and polymeric tubes with CNT embedded therein are formed. In an example, a desired length of the embedded nanotubes are selectively exposed so as to enable contacting a biological fluid disposed or flowing through the capillary. It is also possible to functionalize the inside of the capillaries with fluorinated monolayers to simplify the removal of the glass rod from a finished tube. Further, it is possible to provide additional chemical properties by use of different monomers and cross-linking groups to prepare elastomers having desired mechanical strengths or other properties. The carbon nanotube surface exposed on the interior of the capillary may have various beneficial applications, such as a coating to prevent inflammatory response, or as a stimuli for cell growth using electrical currents for tissue engineering. Although the formation of a synthetic blood vessel or capillary is shown, a similar approach may be used for providing carbon nanotube architectures in any shape which needs to be replicated for biological applications. The flexibility of the use of various polymer materials, as well as the ability to combine chemical characteristics in association with the polymer matrix and embedded nanotube structure, provides a great amount of flexibility in adapting the composites for various applications.

What is claimed is:

1. A carbon nanotube/polymer composite material comprising,
a plurality of carbon nanostructures formed into a predetermined architecture, each of the plurality of nanostructures having a substantially predetermined width and length, and the architecture of the plurality of nanostructures defining at least one orientation for a plurality of nanostructures, and defining the approximate spacing between nanostructures and/or groups of nanostructures,
the carbon nanostructures architecture being at least partially embedded within a polymer matrix in a manner that the architecture is stabilized in the predetermined architecture, with the polymer matrix formed to have a substantially predetermined thickness,
the carbon nanostructures being substantially vertically aligned and extending uniformly in one direction only,
the carbon nanostructures architecture and polymer matrix being positionable between a first surface and a second surface, and the carbon nanostructures maintaining their substantial vertical alignment and uniform one-direction extension when the carbon nanostructures architecture and polymer matrix are positioned between, and under strain from, the first and second surfaces.

2. The composite material of claim 1, wherein the vertically aligned carbon nanostructures adhere the composite to the first and second surfaces by van der Waals forces between the vertically aligned carbon nanostructures and each of the first and second surfaces.

3. The composite material of claim 1, wherein the carbon nanostructures are carbon nanotubes.

4. The composite material of claim 1, wherein the carbon nanostructures are carbon nanofibers.

5. The composite material of claim 1, wherein the carbon nanostructures are approximately 65 microns long, where approximately 25 microns of the carbon nanostructures extend from a surface of the polymer matrix.

6. The composite material of claim 1, wherein the carbon nanostructures extend from a surface of the polymer matrix an amount less than 10 micrometers.

7. The composite material of claim 1, wherein the carbon nanostructures have a packing density of between $10^5/cm^2$ to $10^{12}/cm^2$.

8. The composite material of claim 1, wherein the polymer matrix is selected from the group consisting of poly(dimethylsiloxane) and poly(methyl methacrylate).

9. The composite material of claim 1, the architecture having a first distal end and a second distal end, the polymer matrix having a first distal end and a second distal end, the first distal end of the architecture extending beyond the first distal end of the polymer matrix and the second distal end of the architecture extending beyond the second distal end of the polymer matrix.

10. A carbon nanotube/polymer composite material comprising,
a plurality of carbon nanostructures formed into a predetermined architecture, the architecture having a first distal end and a second distal end, each of the plurality of nanostructures having a substantially predetermined width and length, and the architecture of the plurality of nanostructures defining at least one orientation for a plurality of nanostructures, and defining the approximate spacing between nanostructures and/or groups of nanostructures,
the carbon nanostructures architecture being at least partially embedded within a polymer matrix in a manner that the architecture is stabilized in the predetermined architecture, with the polymer matrix formed to have a substantially predetermined thickness,
wherein the carbon nanostructures are substantially vertically aligned and extend uniformly in only one direction, wherein the second distal end is not embedded within the polymer matrix,
the carbon nanostructures architecture and polymer matrix being positionable between a first surface and a second surface, the carbon nanostructures maintaining their substantial vertical alignment and uniform one-direction extension when the carbon nanostructures architecture and polymer matrix are positioned between, and under strain from, the first and second surfaces,
wherein the carbon nanostructures have a packing density of between $10^5/cm^2$ to $10^{12}/cm^2$ and wherein the polymer matrix is poly(methyl methacrylate).

11. The composite material of claim 10, wherein the carbon nanostructures are carbon nanotubes.

12. The composite material of claim 10, wherein the carbon nanostructures are carbon nanofibers.

13. The composite material of claim 10, the polymer matrix having a first distal end and a second distal end, the first distal end of the architecture extending beyond the first distal end of the polymer matrix and the second distal end of the architecture extending beyond the second distal end of the polymer matrix.

14. A carbon nanotube/polymer composite material comprising,
a plurality of carbon nanostructures formed into a predetermined architecture, the architecture having a first distal end and a second distal end, each of the plurality of nanostructures having a substantially predetermined width and length, and the architecture of the plurality of nanostructures defining at least one orientation for a plurality of nanostructures, and defining the approximate spacing between nanostructures and/or groups of nanostructures,
the carbon nanostructures architecture being at least partially embedded within a polymer matrix in a manner that the architecture is stabilized in the predetermined architecture, with the polymer matrix formed to have a substantially predetermined thickness,
wherein the carbon nanostructures are substantially vertically aligned and extend uniformly in only one direction, wherein the second distal end is not embedded within the polymer matrix,
the carbon nanostructures architecture and polymer matrix being positionable between a first surface and a second surface, the carbon nanostructures maintaining their substantial vertical alignment and uniform one-direction extension when the carbon nanostructures architecture and polymer matrix are positioned between, and under strain from, the first and second surfaces,
wherein the polymer matrix is poly(dimethylsiloxane).

15. The composite material of claim 14, the polymer matrix having a first distal end and a second distal end, the first distal end of the architecture extending beyond the first distal end of the polymer matrix and the second distal end of the architecture extending beyond the second distal end of the polymer matrix.

16. The composite material of claim 14, wherein the carbon nanostructures have a packing density of between $10^5/cm^2$ to $10^{12}/cm^2$.

17. The composite material of claim 14, wherein the carbon nanostructures are selected from the group consisting of carbon nanotubes and carbon nanofibers.

* * * * *